United States Patent [19]

Leenhouts

[11] 4,127,801
[45] Nov. 28, 1978

[54] POWER CHOPPER SUPPLY FOR A BIFILAR WOUND STEPPING MOTOR

[75] Inventor: Albert C. Leenhouts, Harwinton, Conn.

[73] Assignee: The Superior Electric Company, Bristol, Conn.

[21] Appl. No.: 796,950

[22] Filed: May 16, 1977

[51] Int. Cl.$^2$ .............................................. H02K 37/00
[52] U.S. Cl. ..................................................... 318/696
[58] Field of Search ........................ 318/138, 685, 696

[56] References Cited
U.S. PATENT DOCUMENTS

| | | | |
|---|---|---|---|
| 3,732,472 | 5/1973 | Favre | 318/696 X |
| 3,750,000 | 7/1973 | Bruckner et al. | 318/696 |
| 3,812,413 | 5/1974 | Keidl | 318/696 |
| 3,824,440 | 7/1974 | McIntosh | 318/696 |
| 3,826,966 | 7/1974 | Nagasaka et al. | 318/696 |

Primary Examiner—Gene Z. Rubinson
Attorney, Agent, or Firm—Ernest M. Junkins

[57] ABSTRACT

One coil of a bifilar winding of a stepping motor is energized until the current therein reaches a set value and then energization is terminated which creates an induced current that supports the magnetic flux produced by the energizing current and in which the duration of the induced current is increased by being directed through both coils of the winding thereby decreasing the motor's power requirements.

10 Claims, 4 Drawing Figures

POWER CHOPPER SUPPLY FOR A BIFILAR WOUND STEPPING MOTOR

In the operation of a stepping motor, especially over a wide speed range from standstill to 2000 or more steps per second, it has been found necessary to control the power supplied thereto in accordance with the motor's requirements. At no or low stepping rates, less power is need than at high stepping rates and if the power supplied is not tailored or matched to the motor's requirements, inefficiency, motor overheating, etc., may result. One well-known technique for controlling the power has involved intermittently interrupting or disconnecting (chopping) the power supply from the motor with the ratio of the duration of energization and deenergization depending on the motor's requirements, such as it's stepping speed. However, as the windings of the motor constitute an inductance, a change in current flow by chopping or by changing the winding's energization creates an induced current flow in the winding. The current induced by a change of energization is considered undesirable, to be eliminated as quickly and conveniently as possible, as it opposes the current flow for the next energization and hence interferes with the ability of the power supply to effect the next change of energization. The current induced by chopping circulates in the same direction as the power current and they have heretofore basically been tolerated and permitted to either traverse the identical paths as the power current or else be led back to the power supply.

It is accordingly an object of the present invention to provide a power supply for a stepping motor which while alternately connecting and disconnecting the motor to a source of power, decreases the power requirements of the motor especially at standstill and low speeds, without any significant loss of torque of the motor.

Another object of the present invention is to achieve the above object of retaining the induced circulating current in the windings and utilizing it to provide a continuation of the magnetization produced by the power supply energization and further to increase the duration that a useful value of induced circulating current exists in a bifilar winding of the stepping motor by having a different path for the induced circulating current than the power current.

A further object of the present invention is to achieve the above objects while not increasing the opposition of the induced opposing currents to a change of energization of the bifilar windings of a stepping motor when a step is to be produced.

Still another object of the present invention is to provide a power supply for a bifilar wound stepping motor which is economical to manufacture and reliable in use and yet enables a motor to produce its capable output torque over a wide speed range while minimizing the power consumed thereby.

The present invention has a special utility when used to control the power to a stepping motor having a plurality of poles with each pole having a bifilar winding thereon. Each winding has a center tap which divides the winding into two coils. Energization of one coil through its end and the center tap produces one magnetic flux in the pole while energization through the other end and the center tap produces the other magnetic flux in the pole by energizing the other coil. With such a conventional construction, the coils on each pole are thus both magnetically and electrically interconnected.

One coil of some of the poles are serially connected to form one half of a winding phase while the other coils of the same poles are also serially connected to form the other one half of a winding phase. The coils of the remaining poles are similarly serially connected to form another winding phase having two halves. For convenience, each half of the winding phase is herein referred to as a coil. The motor normally has a coil in each phase simultaneously energized for a step position and effects the next step by changing the energization from one coil to the other in one winding phase while maintaining the same coil energized in the other winding phase.

In accordance with the present invention, a power chopping circuit is connected in series with each winding phase and a source of unidirectional power with the chopping circuit effecting either connection of the winding phase to the power source upon closure and hence the supplying of power to the coil or being disconnected therefrom and not supplying power. The chopping circuit senses the value of power current flowing in the coil and effects the supplying of power until the current in the coil to be energized reaches a set value when the circuit disconnects the coil from the power supply for a deenergization period. After expiration of this period, conduction is again effected until the power current attains the selected value which is then followed by another period of deenergization. Preferably, there are a few periods of deenergization for each step. However, at high stepping rates, the time for each step becomes so short that all the time is required for energization by the power source so that the power supply is continuously connected to the motor and there are no periods of deenergization. However, at low speeds or standstill, the power supply may be only connected to a coil for perhaps 5% of the operating time thereby substantially decreasing the power usage of the motor.

During each period of deenergization, substantially the same torque is produced by the motor by using the induced circulating current and causing it to flow in a path which not only includes the energized coil but also includes the other coil of the winding phase. Thus both coils have the induced circulating current flow therein which doubles the duration that a value of induced circulating current may flow that is capable of producing a magnetic flux in the pole that essentially approximates the flux produced when a coil is energized by the power supply. By using the induced circulating current to produce flux, power is thus not required from the power source.

Other features and advantages will hereinafter appear.

In the drawing

Figure 1:
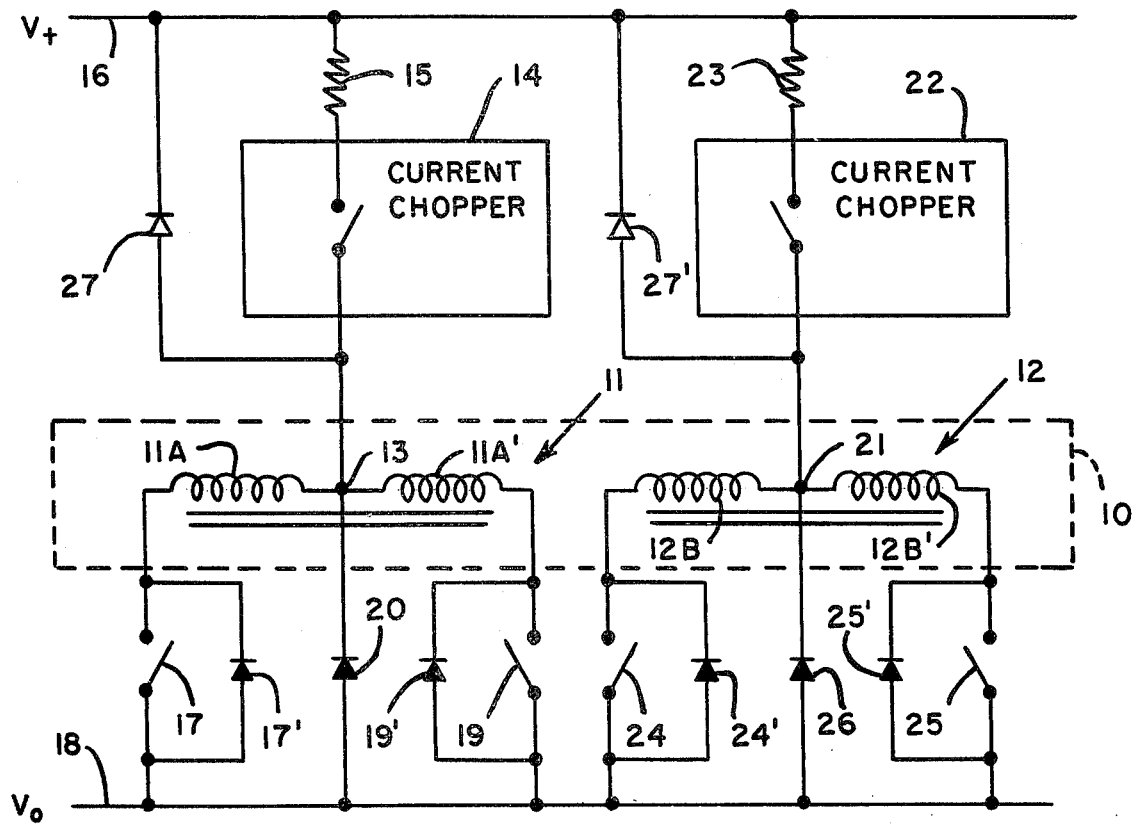
FIG. 1 is a diagrammatic representation of the present invention as applied to a bifilar stepping motor.

Referring to the drawing, FIG. 1, a bifilar wound stepping motor is indicated by the block 10 and includes a winding phase 11 having two coils 11A and 11A' and a second winding phase 12 having two coils 12B and 12B'. The two coils 11A and 11A' have a common junction center tap 13 which is connected through a current chopper 14 and a resistor 15 to the positive side 16 of a unidirectional power source. The other end of the coil 11A is connected through a switching device 17 to the negative side 18 of the power source while a corresponding end of the coil 11A' is also connected through a switching device 19 to the negative side 18. The switching devices 17 and 19 are alternately placed in conducting and nonconducting states with there being one in a state of conduction at all times. Current can thus flow, when permitted by the current chopper, through the center tap 13 and then through the coil whose switching device is in a state of conduction. It will be noted that other elements of the basic circuit include diodes 17' and 19' connected across their respective switching devices and a diode 20 connected between the center tap 13 and the negative side 18.

The winding phase 12 is of similar construction having a center tap 21 at the junction of the coils 12B and 12B' which is connected through another identical current chopper 22 and a resistance 23 to the positive side 16 of the power source. A switching device 24 is connected between the negative side 18 and the other end of the coil 12B while another switching device 25 is similarly connected between the negative side 18 and the end of the coil 12B'. Diodes 24' and 25' are connected across their respective switching devices while a diode 26 interconnects the center tap 21 and the negative side 18.

In a normal four step sequence, one step has the coils 11A and 12B energized by their respective switching devices 17 and 24 being placed in a state of conduction. For another step, switching device 17 remains conducting while switching device 24 is opened and switching device 25 closed to energize winding coil 12B'. For the third step, the switching devices 17 and 19 have their states of conduction changed to energize the coil 11A' and for the fourth step, switching devices 24 and 25 have their conduction states changed to energize coil 12B again. The four different coils are representative of a plurality of winding coils that are similarly connected and reference is made to U.S. Pat. No. 3,684,934, assigned to the assignee of the present invention, for a fuller description of the construction of a bifilar wound stepping motor.

In the winding phase 11, with the switching device 19 being conducting, and with current being conducted through the current chopper 14, power current will flow from the positive side 16 through the winding coil 11A' to the negative side 18. When the current chopper interrupts this current flow, there is a circulating current induced in the winding coil 11A' which initially flows through the closed switching device 19 and upwardly through the diode 20 to the center tap 13 with the direction of the induced circulating current being in the same direction as the power current through the coil 11A'. There is also provided a path through the switching device 19 and the diode 17' to the end of the coil 11A so that in this latter path, both winding coils of the winding phase are in the path of the induced current that was generated just in the winding coil 11A' by the chopper 14 effecting the deenergization. The initial flow through the diode 20 occurs because of leakage inductance and only momentarily exists and thus essentially for the complete duration that the chopper 14 prevents power current flow, the induced circulating current path is through both coils of the winding phase.

Since each coil has the same number of winding turns, so that the number of winding turns carrying current is doubled, the value of the induced circulating current will be reduced to approximately one half the value it had at the moment of interruption which essentially equalled the value of the power current. Further, since all the turns of the winding phase are now carrying current, not only is the whole winding phase providing magnetization of the pole, but further, the decay rate of the induced circulating current is reduced to one-half the rate which it would have if it was only passing through one coil. When the current chopper 14 again connects the coil 11A' to the power source, the induced circulating current by flowing in the same direction as the power current, does not oppose the flow of the power current.

When a change of energization occurs in the winding phase 11 as by the switching device 19 becoming nonconducting while the switching device 17 becomes conducting, an induced opposition current is created but it flows oppositely through a path containing diode 17', coil 11A and a diode 27, that is connected to bypass the current chopper 14 to the positive source 16. This change of energization induced opposition current opposes the energization of the winding coil 11A but it quickly decays to be overcome by the power source so that the power current can flow from the power source through the current chopper 14, coil 11A and switch-device 17. The current chopper will cease such power current flow when it attains a selected value and create an induced circulating current flow through a path that initially includes switching device 17, diode 20 and coil 11A which then quickly shifts to a path containing switching device 17, diode 19', coil 11A' and coil 11A. As before, this induced circulating current path includes all the windings of the winding phase 11, has a value that essentially is half that of the power current, and hence its decay rate is halved. Upon cessation of the period of deenergization, the current chopper will again energize the coil 11A until the energizing current reaches the selected value.

Upon the change of energization from coil 11A to coil 11A', by switching devices 17 and 19 shifting their respective states of conduction, an induced circulating current is generated which again opposes the current from the power source and hence will flow through the diode 19', coils 11A' and diode 27. Upon its decay, the power source will again provide power current to the coil 11A' through the current chopper 14.

The induced opposing currents caused by changes of energization are those that typically occur during a change of energization and the present motor energizing circuit does not alter the opposing effects thereof as compared with the effects produced by other motor energizing circuits. However, in the present invention, the induced circulating currents are utilized to maintain the magnetic flux produced when the current chopper 14 is conducting. Moreover, by passing through both coils of the bifilar winding, the time in which they can produce useable magnetic flux is caused to be doubled as compared to flowing through a path that included just one coil. It will be noted that both coils 11A and 11A' have the same number of turns, and that the value of the induced current is only essentially one-half that of the power current which effects the doubling of the useable decay time while producing essentially the same number of ampere turns of magnetic flux.

Figure 2:
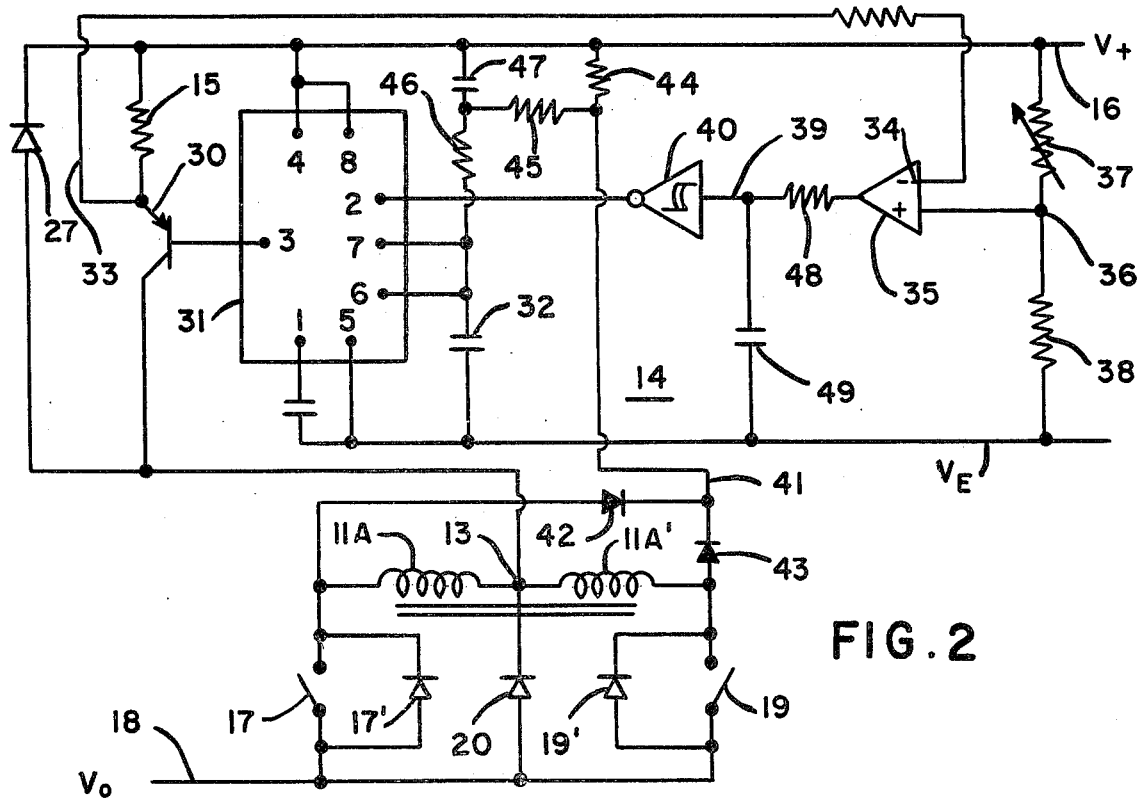
FIG. 2 is an electrical schematic diagram of one embodiment of the current chopper of the present invention applied to one winding phase of the motor.

Shown in FIG. 2 is an electrical schematic diagram of the winding phase 11 and its current chopper 14. The winding phase 12 and its current chopper 22 together with corresponding diode 27' are identical in construction and function and hence are not specifically shown. It is also noted that the above-described operation of the winding phase 11 with respect to the flow of induced opposing and circulating currents and power current equally applies to the winding phase 12 since identical currents occur therein.

The heretofore mentioned elements are identified by their same reference numeral in FIG. 2 as in FIG. 1. The chopper 14 includes a transistor 30 which is connected between the positive voltage 16 and the center tap 13 and when in a state of conduction permits current to flow therethrough while when not conducting, disconnects the winding phase 11 from the source of power. The base of the transistor 30 is connected to an output terminal, identified by the numeral 3, of a monolithic timing circuit 31, such as an integrated circuit type 555, connected as a monostable one shot having a selectable "on" duration. The timing circuit 31 has a trigger terminal, indicated by the numeral 2, which, when low voltage is applied thereto, causes the terminal 3 output voltage to increase to a high value which prevents conduction of the transistor 30 and the terminal 3 will remain high for a duration determined by the value of the voltage across a capacitor 32. After the lapsing of such a time, the terminal 3 becomes low and will remain low until a trigger voltage is again applied to the terminal 2.

In the chopper circuit, the transistor 30 is caused to conduct until the value of power current flowing through the energized coil attains a selected value, with one typical value being 10 amperes. The value of power current is sensed by a lead 33 connected to the junction of the emitter of transistor 30 and the resistor 15 and on which is produced a voltage that is related to the value of power current flowing. This voltage is applied to a negative terminal 34 of a voltage level comparator 35 while its positive terminal is connected to a junction 36 of a variable resistor 37 and a fixed resistor 38. The other end of resistor 38 is connected to a lead $V_E$ on which, in any convenient manner, a value of voltage exists that is always constantly 5 volts lower than the value of the voltage at the positive side 16. The junction 36 is thus provided with a constant value of positive voltage whose value is selected by the setting of the resistor 37 which in turn is determined by the value of the power current at which it is desired to effect a period of deenergization. The use of the lead $V_E$ assures that value of the voltage at the junction 36 will remain constant even with fluctuations in the value of the voltage of the power source.

The level comparator 35 is a high gain operational amplifier, such as an integrated circuit type LM324, so that when the winding current has a value less than the deenergization value, the terminal 34 has a higher voltage than the junction 36. A low voltage triggering signal will thus appear on an output lead 39 of the amplifier and be directed to the input terminal of a Schmitt trigger indicated by the reference numeral 40. The inverted output of the Schmitt trigger 40 is connected to the terminal 2 of the timing circuit 31.

Accordingly, when the power current increases in value to the selected deenergization value, the inputs to the comparator 35 become essentially equal, increasing its output voltage. The increase causes the Schmitt trigger 40 to apply a triggering signal to the terminal 2 which causes the terminal 3 of the timing circuit to stop conduction of the transistor 30. The transistor 30 is maintained non-conducting for a set period of time in this embodiment of the chopper circuit after which the terminal 3 shifts to a low state to effect conduction of the transistor 30 and power current conduction until the voltages on the terminals 34 and 36 again become approximately equal at which time the Schmitt trigger 40 will be actuated to apply a triggering signal to the terminal 2 to cause the terminal 3 to again shift to its high state to prevent conduction of the transistor 30 for another set period of time.

It has been found desirable to have a plurality of periods of deenergization for each step so that for example at standstill, such a period may be of 2 or so milliseconds duration. However, as the stepping rate increases, the duration for a step decreases and the duration during which deenergization may occur accordingly is reduced. To still maintain a few periods of deenergization for each step, the duration of the set period of deenergization is caused to decrease in duration as the stepping rate increases. An increase in the stepping rate causes the voltage at each end of the coils 11A and 11A' to increase because of their constant value of inductance and the increasing frequency of the changes of energization and this voltage is employed to alter the duration of the deenergization period. A lead 41 is connected to the junction of diodes 42 and 43 that are, in turn, connected to the ends of the coils 11A and 11A' respectively and the lead 41 applies the energized coil voltage to the junction of two fixed value resistances 44 and 45 with the former being connected to the positive side 16 and the latter being connected through a resistor 46 to the capacitor 32. Additionally, the resistor 45 is connected to a capacitor 47 that is also connected to the positive voltage 16 so that the capacitor 47 tends to average or filter voltage fluctuations.

With this structure, as the stepping rate increases, the voltage in the lead 41 also increases which increases the voltage at the junction of resistors 44 and 45 and which, in turn, provides a higher voltage for charging the capacitor 32 to increase the charging rate thereof. As the timing cycle of the timing circuit 31 stops when the capacitor 32 has a selected voltage thereacross, the faster charging rate decreases the time to charge the capacitor and thus shortens the time that the terminal 3 remains high to prevent energization of the winding phase.

For values of stepping speed above a selected level, as for example 2200 steps per second, the entire duration that a step exists is required in order for the power current to attain the desired value, and hence a period of deenergization does not occur.

It has been found desirable to introduce some delay in producing the triggering signals, to assure at least a minimum duration triggering signal. Such a delay may be provided by having the Schmitt trigger 40 have some hysteresis together with a R-C network that includes a resistor 48 and a capacitor 49.

In one embodiment of the invention, where the motor is at standstill with basically no load, the motor is required to be energized only about 5% of the time to maintain its stationary torque while at a stepping speed of perhaps 2200 steps per second the motor is continually energized. Between these two limits, the percentage of energization for each step essentially increases linearly for the intermediate stepping rates. As heretofore mentioned, the maximum duration of a period of deenergization may be on the order of perhaps 2 milliseconds for standstill and decrease to 0.2 milliseconds at high stepping rates.

Figure 3:
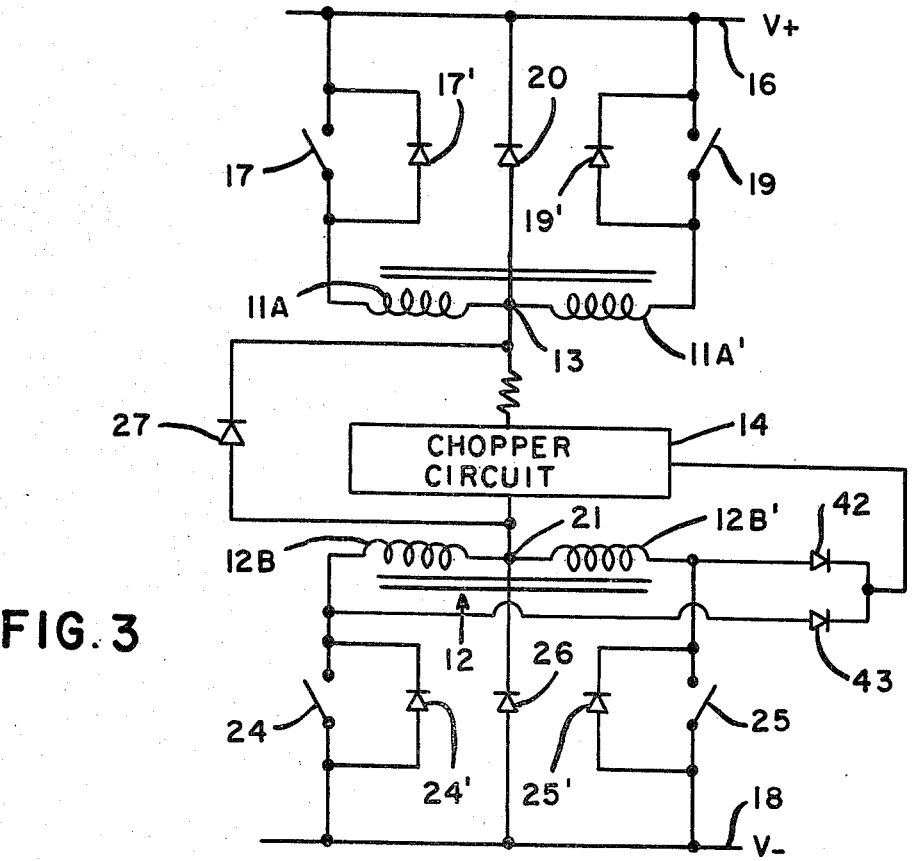
FIG. 3 is a diagrammatic representation of a manner of interconnecting one current chopper to control current flow in both winding phases of a bifilar motor.

Shown in FIG. 3 is another manner of interconnecting a two winding phase bifilar stepping motor so that only one chopper circuit is required to control the energization of both winding phases. Thus, in this embodiment, the motor 10 is unchanged and the winding coils 11A and 11A' have their center tap 13 connected through a current chopper, such as the chopper 14, to the center tap 21 of the winding phase 12 having coils 12B and 12B'. Changes of energization of the different coils are from the positive supply 16 by way of switching devices 17, 19, 24 and 25. It will also be noted that the switching devices have diodes connected thereacross in the manner shown and that diodes corresponding to the diodes 20 and 26 are also included in order to enable the induced circulating currents to circulate through both coils of the winding phase when the current chopper effects deenergization. Further, diodes 27, 42 and 43 are also included. When the chopper circuit 14 effects deenergization, induced currents flow in both winding phases to support the magnetic flux thereby further decreasing the quantity of power required.

One manner of controlling the switching devices 17, 19, 24 and 25 to energize the coils in a predetermined sequence is disclosed in U.S. Pat. No. 3,280,395, assigned to the assignee of the present invention.

Figure 4:
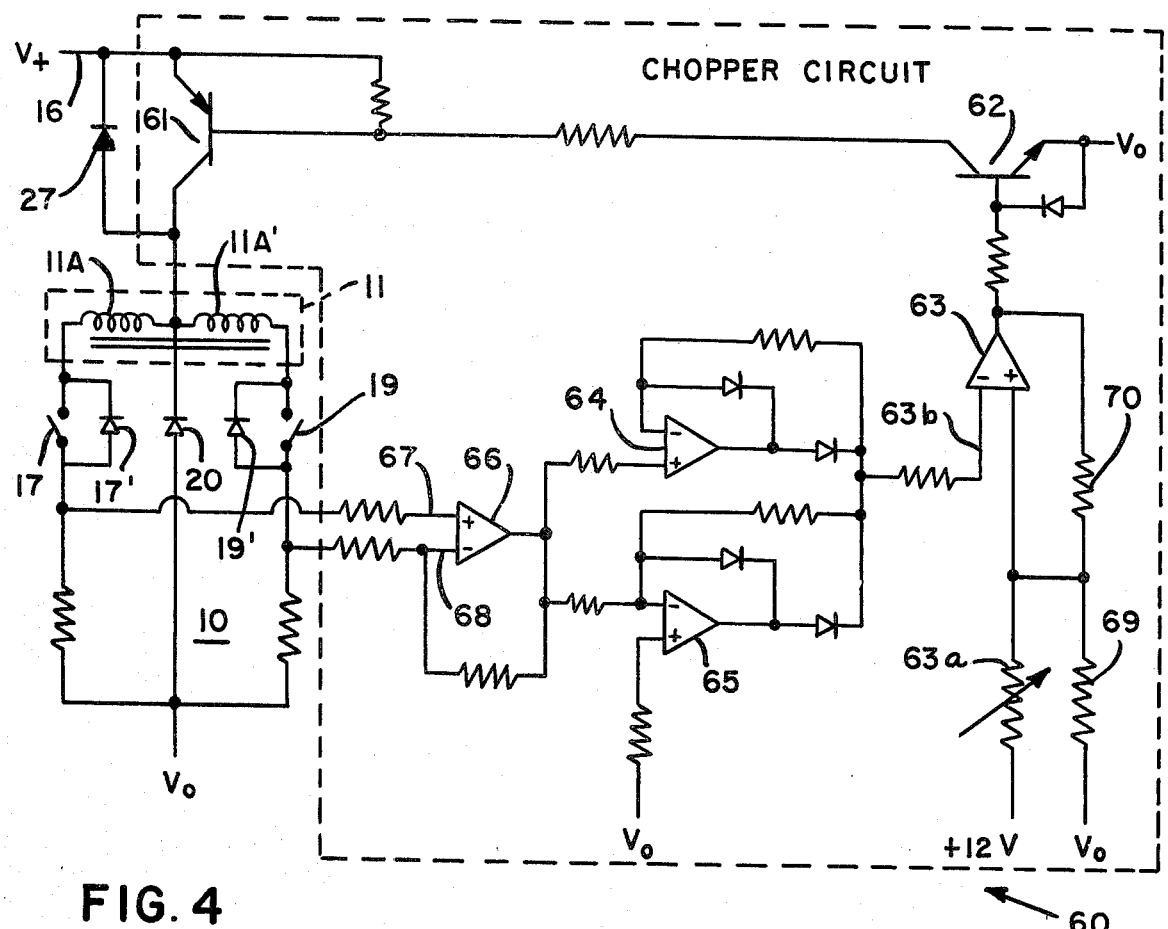
FIG. 4 is an electrical schematic diagram of another embodiment of a current chopper applied to one winding phase of a motor.

While the above-described embodiment of the chopper circuit 14 depends on controlling the duration of the periods of deenergization, in the embodiment of a current chopper shown in FIG. 4, the duration of each period of deenergization is controlled by the value of the induced circulating current. Thus, if the chopper circuit is set to start a period of deenergization when the power current has a value of, for example 10 amperes, the period of deenergization is set to terminate when the induced current decays to a value of no less than for example 4.5 amperes, thereby providing a range of ampere turns in the winding with a variation of no more than about 10%.

In the embodiment of the chopper circuit shown in FIG. 2, the extent of the change in the ampere turns that occurs during a deenergization period is controlled by the "off" time of the timer 31 which in turn is controlled by the value of the motor voltage sensed by the lead 41. In the FIG. 4 embodiment, the combination of the motor and its load, which sets the decay rate controls the duration of the deenergization period. Thus while the former circuit is preferably set to have a few periods of deenergization per step, the latter embodiment chooses the number of periods per step that it needs to maintain the ampere turns produced by circulating current within the desired range.

The current chopper embodiment shown in FIG. 4 is generally indicated by the reference numeral 60 and is shown connected to the winding phase 11 of the motor 10 with the various parts of the motor being indicated by the same heretofore utilized reference characters. An identical chopper circuit 60 may also be used with the winding phase 12 or only one chopper circuit if the winding phases are connected in series as described in connection with FIG. 3.

The chopper 60 includes a transistor 61 that controls the energization of the winding phase by its series connection to the source of unidirectional power. The transistor 61 has a base connected to another transistor 62 whose base is connected to the output of an operational amplifier 63 which controls the state of conduction or non-conduction of the transistor 62. The amplifier 63 has a constant voltage supplied to its plus input terminal whose value is fundamentally set by the setting of an adjustable resistor 63a with the setting of the latter determining the value of the maximum power current desired to flow in the winding phase. The negative input terminal of the amplifier 63 is connected in parallel to the outputs of a pair of operational amplifiers 64 and 65, which are connected as a precision full wave rectifier. A common input to each amplifier 64 and 65 is obtained from the output of another operational amplifier 66. Inputs 67 and 68 to the amplifier 66 are connected to resistors which are in series with coils 11A and 11A' across the power source.

With the above structure, when the switching device 19 is closed to energize coil 11A', the potential on the input 68 increases with increasing current flow through the coil 11A' while the potential on the input 67 basically remains at ground level. The output of the amplifier 66, by reason of the voltage difference between its two inputs, begins to increase the negative value of its output voltage which increases the positive output voltage of the amplifier 65 so that an increasing positive voltage appears on the input 63b of the amplifier 63. The output of the latter amplifier begins to decrease as the potential difference between its inputs decreases which in turn decreases the voltage on the base of transistor 62. When the output of the amplifier 63 becomes so low, as occurs when its two inputs thereof are essentially at the same potential, the transistor 62 ceases conduction which in turn causes transistor 61 to cease conduction and a period of deenergization begins.

During the deenergization period, the value of induced circulating current in the winding phase 11 is only one half of the coil power current. The voltage on the input 68 will accordingly be reduced to about one half that which the value of power current produces but the input 67 will have an increasingly negative voltage rather than a ground potential so that the numerical difference between the two voltages will be related to twice the value of the induced circulating current flowing. As the amplifier 65 output is responsive to the voltage difference between its inputs, it will thus produce the same output potential for a value of the induced circulating current that is one half that of the power current.

As the induced circulating current value diminishes, the output of the amplifier 65 decreases which increases the input difference to amplifier 63 and increases the output voltage thereof. When the minimum desired value of induced circulating current is attained, the output of amplifier 63 attains a value causing transistors 62 and 61 to conduct to cause power current to be supplied from the power source. As above explained, the power current will increase until it reaches the selected value at which time another period of deenergization will occur.

The plus input terminal of the amplifier 63 is also connected through a resistor 69 to the negative side, $V_O$ of a constant voltage source having a +12V terminal connected to the resistor 63a. While this provides a constant settable value of voltage at the plus input terminal, there is also connected thereto a resistor 70 which is also connected to the output of the amplifier 63. The amplifier 63 has high gain, thus having either a high output voltage or not. When the voltage is high, power current is being supplied to the winding phase and the resistor 70 does not alter the voltage at the amplifier 63 input terminal. When there is essentially no output voltage, the resistor 70 lowers the voltage at the input terminal, thus enabling a lower value of circulating current to shift the state of the amplifier output. The resistor 70 thus sets the lowest value of induced circulating current. Preferably the difference between the high value of power current and the lowest value of circulating current produces no more than about a 10% change in the ampere turns.

It will accordingly be understood that there has been disclosed a motor energizing circuit for controlling the energy supplied to a stepping motor in accordance with its requirements. The circuit utilizes a current chopper that provides periods of energization and deenergization with an induced circulating current being created in each period of deenergization. The circulating current is used to maintain the same magnetic flux during the deenergization periods as was produced by the power current during energization. However, the duration in which a useable value of induced circulating current flows is caused to be essentially doubled by enabling the induced circulating current which is created in one coil of a bifilar winding to flow in both of the winding coils, thereby decreasing the time in which power current is needed. As the motor's stepping rate increases, requiring more power, the duration for deenergization periods is decreased. At a high stepping rate, the motor will thus become continually energized in order to meet its power demands. The extent of a period of deenergization is set in one embodiment of a chopper by using a duration of time while in another embodiment by the ampere turn value of the induced circulating current.

Variations and modifications may be made within the scope of the claims and portions of the improvements may be used without others.

I claim:

1. A stepping motor energizing circuit for controlling the flow of energy from a unidirectional source of power to a stepping motor having at least one bifilar winding formed into two coils that are inductively associated with each other, a switching device connected in series with each coil and the source of power and being shiftable between states of conduction and non-conduction, means for causing one of said switching devices to have a conducting state and the other a non-conducting state, chopper means connected in series between said winding and the source of power and including means for alternately connecting and disconnecting the winding to the power source with each connection causing the energization of one coil, and means for forming a path for the induced circulating current created in the coil having the conducting switching device when the chopper means effects disconnection of said one coil from the source of power with the said path including the other coil whereby the induced current flows in both coils that are inductively associated with each other.

2. The invention as defined in claim 1 in which the path means directs the induced circulating current through the other coil in a direction which produces the same direction of magnetic flux as the magnetic flux produced by the coil in which the induced circulating current was created.

3. The invention as defined in claim 1 in which the two coils have adjacent ends formed into a common center tap and in which the path means directs the induced circulating current to flow in the coil which created the induced circulating current in a direction away from the center tap and in a direction in the other coil towards the center tap.

4. The invention as defined in claim 1 in which there is a diode connected across each switching device and in which the path means includes the diode of the switching device that is non-conducting.

5. The invention as defined in claim 4 in which the path means includes the switching device that is conducting.

6. The invention as defined in claim 1 in which the two coils have adjacent ends connected to form a center tap and in which the chopper means is connected to the center tap.

7. The invention as defined in claim 6 in which there is a diode connected between one side of the power source and the center tap to be conductive to current flowing away from the one side.

8. The invention as defined in claim 1 in which the chopper means includes means for maintaining conduction for a duration that is terminated by a selected value of current flowing from the source of power through the energized coil, in which there are means for repeatedly shifting the states of the switching means, in which the chopper means includes means for maintaining non-conduction for a determinable duration and in which there are means for sensing the rate of the shifting means and decreasing the duration as the rate increases.

9. The invention as defined in claim 1 in which there are two bifilar windings with each having two coils and in which there is a chopper means connected between each winding and the source of power.

10. The invention as defined in claim 1 in which there are two bifilar windings with each having two coils and in which the chopper means is connected in series with the two windings across the source of power.

* * * * *